US011809576B2

(12) United States Patent
Tsirkin et al.

(10) Patent No.: US 11,809,576 B2
(45) Date of Patent: Nov. 7, 2023

(54) ESTABLISHING SECURE REMOTE ACCESS TO DEBUG LOGS

(71) Applicant: Red Hat, Inc., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 16/777,153

(22) Filed: Jan. 30, 2020

(65) Prior Publication Data
US 2021/0240839 A1 Aug. 5, 2021

(51) Int. Cl.
*G06F 21/60* (2013.01)
*G06F 21/31* (2013.01)
*G06F 9/455* (2018.01)
*G06F 11/30* (2006.01)
*G06F 11/34* (2006.01)

(52) U.S. Cl.
CPC ........ *G06F 21/602* (2013.01); *G06F 9/45558* (2013.01); *G06F 11/301* (2013.01); *G06F 11/3476* (2013.01); *G06F 21/31* (2013.01); *G06F 2009/45587* (2013.01); *G06F 2009/45595* (2013.01)

(58) Field of Classification Search
CPC .. G06F 21/602; G06F 9/45558; G06F 11/301; G06F 11/3476; G06F 21/31; G06F 2009/45587; G06F 2009/45595
See application file for complete search history.

(56) References Cited

U.S. PATENT DOCUMENTS

| 8,909,928 | B2 | 12/2014 | Ahmad et al. |
| 9,251,368 | B2 | 2/2016 | Booth et al. |
| 9,298,914 | B1 | 3/2016 | McCorkendale |
| 10,171,470 | B2 | 1/2019 | Burch et al. |

(Continued)

FOREIGN PATENT DOCUMENTS

| JP | 5679989 B2 | 3/2015 |
| WO | 20190191072 | 10/2019 |

OTHER PUBLICATIONS

Debugging Access Controls <http://servicenowmypath.blogspot.com/2017/10/debugging-access-controls-servicenow.html> retrieved Jan. 2020, 2 pages.

(Continued)

*Primary Examiner* — Emerson C Puente
*Assistant Examiner* — Jonathan R Labud
(74) *Attorney, Agent, or Firm* — Lowenstein Sandler LLP

(57) ABSTRACT

Systems and methods are disclosed for establishing secure remote access to debug logs. An example method may comprise: receiving, by a processing device, from a computing device, an encrypted virtual disk image comprising a set of debug logs; initiating, by the processing device, instantiation of a virtual machine (VM) using the encrypted virtual disk image, wherein the VM is to execute a log access application to analyze the set of debug logs; sending, to the computing device, a request for access to the set of debug logs by the log access application; receiving, from the computing device, an indication granting access to the set of debug logs by the log access application, wherein having access to the set of debug logs allows the log access application to analyze the set of debug logs to identify an issue associated with the set of debug logs.

19 Claims, 9 Drawing Sheets

(56) References Cited

U.S. PATENT DOCUMENTS

| | | | |
|---|---|---|---|
| 10,225,152 B1* | 3/2019 | Roth | G06F 21/6236 |
| 10,268,566 B2* | 4/2019 | Merkle | H04L 67/10 |
| 10,361,868 B1 | 7/2019 | Baker | |
| 10,417,433 B2 | 9/2019 | Kelso et al. | |
| 10,511,636 B2 | 12/2019 | Vaidya et al. | |
| 2002/0112064 A1* | 8/2002 | Eastvoid | H04L 29/06 |
| | | | 709/230 |
| 2005/0149750 A1 | 7/2005 | Lisanke | |
| 2006/0075228 A1 | 4/2006 | Black et al. | |
| 2011/0023019 A1* | 1/2011 | Aniszczyk | G06F 9/45504 |
| | | | 717/128 |
| 2011/0145659 A1 | 6/2011 | Ikeyama | |
| 2011/0202916 A1* | 8/2011 | VoBa | G06F 9/45558 |
| | | | 718/1 |
| 2011/0231710 A1* | 9/2011 | Laor | G06F 11/366 |
| | | | 714/38.11 |
| 2012/0216052 A1* | 8/2012 | Dunn | G06F 21/78 |
| | | | 713/193 |
| 2012/0278658 A1* | 11/2012 | Han | G06F 11/3636 |
| | | | 714/38.1 |
| 2012/0311477 A1 | 12/2012 | Mattos et al. | |
| 2013/0054680 A1 | 2/2013 | Nakano | |
| 2014/0032932 A1* | 1/2014 | Hiar | G06F 12/1408 |
| | | | 713/190 |
| 2016/0011766 A1* | 1/2016 | Kosaka | G06F 3/0488 |
| | | | 715/787 |
| 2016/0253254 A1* | 9/2016 | Krishnan | G06F 11/0766 |
| | | | 717/124 |
| 2016/0342499 A1* | 11/2016 | Cheng | G06F 11/3664 |
| 2017/0004066 A1* | 1/2017 | Lentz | G06F 11/3664 |
| 2017/0302458 A1 | 10/2017 | Berger et al. | |
| 2019/0042348 A1 | 2/2019 | Krithivas | |
| 2019/0045016 A1 | 2/2019 | Dewan et al. | |
| 2019/0253398 A1 | 8/2019 | Sun | |
| 2020/0125772 A1 | 4/2020 | Volos | |
| 2020/0153629 A1 | 5/2020 | Yitbarek et al. | |
| 2020/0259836 A1 | 8/2020 | Kumar | |
| 2020/0264958 A1 | 8/2020 | Blass | |
| 2020/0394280 A1 | 12/2020 | del Valle Diharce | |
| 2021/0209201 A1 | 7/2021 | Ge | |

OTHER PUBLICATIONS

Liu; "Using Log Files as Knowledge Bases," 2013 Second IIAI International Conference on Advanced Applied Informatics, Los Alamitos, CA, USA, 2013, pp. 80-83, doi: 10.1109/IIAI-AAI.2013. 38.

* cited by examiner

ESTABLISHING SECURE REMOTE ACCESS TO DEBUG LOGS

TECHNICAL FIELD

The present disclosure is generally related to computer systems, and is more specifically related to establishing secure remote access to debug logs.

BACKGROUND

Debugging refers to a process of identifying and resolving errors or issues associated with a computer system, such as computer hardware and/or software, which prevent correct operation of the computer system. Debugging can involve various techniques, such as, static analysis (e.g., examining the code), print debugging (watching live or recorded print statements indicating the flow of execution of a process), remote debugging (debugging a program running on a system different from the debugger), post-mortem debugging (debugging of the program after it has already crashed), etc. For many of the debugging techniques, some type of a computer log file or tracing data may be used.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
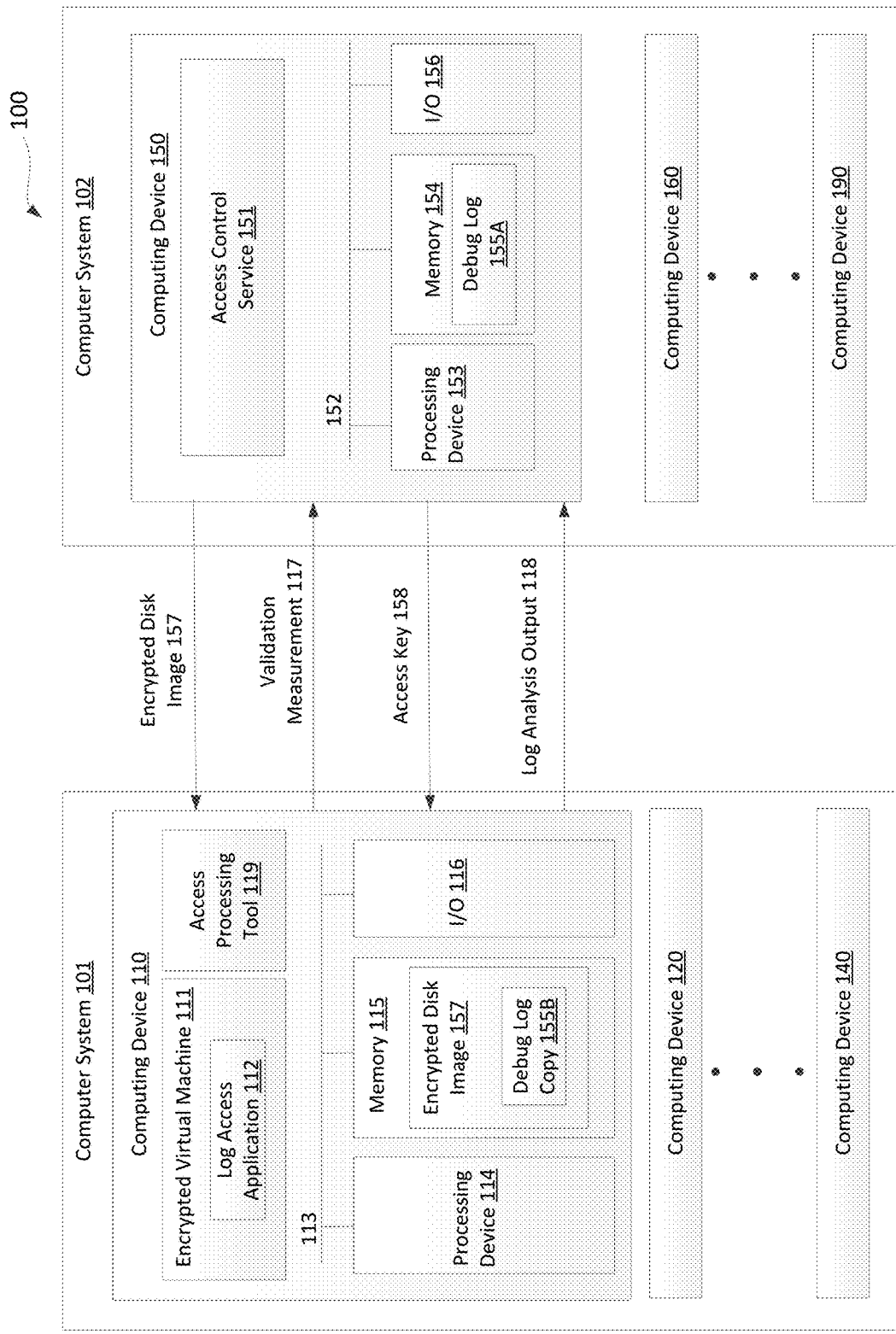
FIG. 1 depicts a high-level block diagram of an example computer system architecture, in accordance with one or more aspects of the present disclosure.

Described herein are methods and systems for establishing secure remote access to a set of debug logs to identify an issue associated with a computer system. A computer system may include hardware, software, applications, operating systems, and virtual machines, each of which may be susceptible to various errors or issues, often referred to as "bugs." "Debugging" refers to a process of identifying and resolving the bugs associated with the computer system that can prevent correct operation of the computer system. As discussed, debugging can involve various techniques, many of which utilize computer log files and/or tracing data (also referred to as "debug logs," "logs," or "log" hereinafter) that record process steps and transactions that occur during the operation of the computer system. A "debugger" can analyze the debug logs and identify the bug so the bug can be fixed (e.g., resolved). The debugger can be a software application, a human user, or a combination.

For many systems, the debug logs may reside on a computing device that is different than the computing device on which the debugger needs to analyze the debug logs. For example, a computer product developed by a product owner may be provided to a customer of the product owner for use. The customer may use the computer product on its own computer system or a computer system that is not part of the product owner's computer system. While operating the computer product, the customer may generate logs on the computer system where the product is used. In some examples, trace and debug log collection utilities are used to collect the logs. The logs may be stored on a computer system that is not part of the network of the product owner's computer system. When the customer needs an analysis of the debug logs to identify existing bugs or potential future issues, the product owner may supply a debugger to analyze the debug logs and identify the bugs and issues.

In conventional systems, a debugger may gain access to the debug logs in a few ways. Typically, a debugger has access to appropriate tools to analyze the debug logs on the product owner's computer system. Therefore, in order to have access to the debug logs at the product owner's computer system, the debug logs can be transmitted to the product owner's computer system. However, there are usually significant security concerns for transmitting logs directly to another computer system over a network. On one hand, if an entire set of logs are uploaded from one computer system to another computer system over a network, there may be severe security and privacy implications. On the other hand, if logs are uploaded on a selective basis, only uploading requested information, then the process of debugging and effectively resolving the bugs can get delayed and there may be repeated requests for more of the debug logs.

In some situations, a limited VPN (Virtual Private Network) access can be typically arranged that can provide a secure connection, such that either the customer can log into the product owner's computer system, or the debugger can log into the customer's computer system. The process can result in high latency access for the parties. In such cases, instead of obtaining access to the debug logs, the customer may be asked to reproduce the bug in that environment. However, reproducing a bug may not be possible or easy enough for the customer. Additionally, a stability issue that causes the bug may also prevent stable VPN connection for accessing the computer system or the debug logs. In some other situations, the debug logs can be uploaded to a third party secure system (e.g., SpiderOak™), and later give the product owner access to the third party system. However, there is usually latency issue involved with the third party solution and it may be too late to prevent the stability issue that can have meaningful business impact.

Aspect of the present disclosure address the above and other deficiencies by providing technology that can establish a secure remote access to debug logs such that the debug logs can be analyzed without exposing the debug logs to security threats while identifying an existing bug or a potential future issue efficiently. For example, the technology may provide for a first computer system to supply debug logs in form of an encrypted virtual disk image to a second computer system. A virtual disk image may have a structure that mimics a physical disk format. Encrypted virtualization provides a security paradigm that protects VMs from physical threats, threat from other VMs and a hypervisor that manages the VMs, threat of the applications running on the VMs to attack its environment, etc. After receiving the disk image, the second computer system may initiate the launching of a virtual machine (VM) using the encrypted virtual disk image. The VM may be configured to execute a particular log access application that is used to analyze the debug logs. The second computer system may send a request to the first computer system to allow access to the debug logs. In an example, the request can accompany a validation measurement (e.g., a digital signature or a cryptographic signature generated by the second computing device) to indicate that the VM is configured to execute the particular log access application. Using the validation measurement, the first computer system can validate that the VM is indeed configured to execute the particular log access application. The first computer system can then send an access key for the encrypted virtual disk image to the second computer system. The second computer system can use the key to decrypt the disk image and instantiate the VM to access the debug logs. The log access application can access and analyze the debug logs to identify an issue associated with the debug logs. The second computer system can provide a report, including output of the log access application, to the first computer system indicating the issue identified by the first computer system. The second computer system can also provide a record of the access history to the debug log by the log access application for auditing by the first computer system as added security measures.

In an implementation, the first computer system may define a security policy that allows partial access to the debug logs. For example, the security policy may dictate that a separate request be made for access to each type of data in the debug logs. Thus, the second computer system can send a request to the first computer system for access to a specific type of data. As a result, the first computer system can assess each request separately and determine whether access to a specific portion of the debug logs corresponding to the requested data type is indeed necessary to be allowed. For example, the access request can be vetted by a human user if necessary. Once it is determined that the access request is safe to be granted, the first computer system can send a first access key to the second computer system to access a first portion of the debug logs. The second computer system can use the first access key to decrypt a portion of the disk image to access the portion corresponding to the requested data type. The permission granting access to the first portion of the debug logs can be stored in a cache memory for fast access to the first portion for a subsequent request for the same type of data. Additionally, the second computer system can request for a different type of data and the first computer system can provide a different access key to access and decrypt another portion of the debug logs corresponding to the different type of data request.

The systems and methods described herein include technology that enhances the overall performance of computer systems by allowing efficient and timely access to debug logs to resolve system bugs without exposing the debug logs to security risks and privacy concerns. In particular, providing an encrypted disk image over a network allows the data to be transmitted securely. The validation mechanism can ensure that only an authorized application can gain access to the debug logs, or particular portions of the debug logs, and that the access to the debug logs is controlled by the computer system that generated the debug logs. The access keys can provide the benefit of allowing secure remote access by the debugger to the debug logs, while allowing the access to only an authorized log access application. Executing the authorized application in a virtual machine allows the developer (e.g., product owner) to execute the application in development environment with additional security without worrying about security threats. As a result, debugging existing and potential future issues can be performed timely enough such that meaningful measurements can be taken to resolve the issues. Thus, the technology improves performance and accuracy of computer systems and decreases security threats associated with remote access of debug logs.

Various aspects of the above referenced methods and systems are described in details herein below by way of examples, rather than by way of limitation.

FIG. 1 illustrates a computer system 100 in which embodiments may operate. It should be noted that other architectures for computer system 100 (also referred to herein as system 100) are possible, and that the implementation of a computer system utilizing embodiments of the disclosure are not necessarily limited to the specific architecture depicted by FIG. 1. Terms such as "machine," "device," "computer," and "computing system" may be used interchangeably and synonymously throughout this document.

Computer system 100 may include a single computer system or multiple computer systems arranged in a heterogeneous or homogeneous group (e.g., cluster). Computer system 100 may include one or more computer systems, for example, computer systems 101, 102, etc. in accordance with one or more aspects of the present disclosure. Computer systems 101 and/or 102 may include computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to establish secure remote access to debug logs. In one example, computer system 100 may include a computing device implemented with x86 hardware. In another example, computer system 100 may include a computing device implemented with PowerPC®, SPARC®, or other hardware. Computer system 100 may include one or more virtual machines and a hypervisor. In some implementations, the computer systems 101 and 102 are often located in a data center.

Each of the computer systems 101 and 102 may include a single or multiple computing devices. For example, computer system 101 may include computing devices 110 to 140, and computer system 102 may include computing devices 150 to 190. Each of the computing devices of computer system 101 may include hardware components 113, such as a processing device 114, memory 115, and input/output interfaces (I/O) 116. Each of the computing devices of computer system 102 may include hardware components 152, such as a processing device 153, memory 154, and input/output interfaces (I/O) 156. Computer system 100 may include additional or different components, devices, and/or connectors in various implementations of the disclosure. Hardware components 113 and 152 may provide hardware functionality for performing various computing tasks.

One or more processors may be embodied as processing device 114 (or processing device 153), which can be a micro-processor, digital signal processor (DSP), or other processing component. Processing device 114 (or 153) may process various received data and may carry out the code or instructions or one or more computer programs, for example, to provide input/output operations specified by the instructions. Processing device 114 (or 153) may be capable of executing the computing tasks described in the present disclosure. Processing device 114 (or 153) may be a single core processor that is capable of executing one instruction at a time (e.g., single pipeline of instructions) or may be a multi-core processor that simultaneously executes multiple instructions. The instructions may encode arithmetic, logical, or I/O operations. In one example, Processing device 114 (or 153) may be implemented as a single integrated circuit, two or more integrated circuits, or may be a component of a multi-chip module (e.g., in which individual microprocessor dies are included in a single integrated circuit package and hence share a single socket).

Memory 115 (or memory 154) may include volatile memory devices (e.g., random access memory (RAM)), non-volatile memory devices (e.g., flash memory), ROM (read-only memory), EEPROM (electrically erasable programmable read-only memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.). Various data of the computer system 100 may be stored in memory 115 or 154. For example, memory 154 is shown to include debug log 155A, and memory 115 is shown to include an encrypted disk image 157, and debug log copy 155B (also referred to as "debug logs 155B" hereinafter).

Computer system 100 may include one or more repository (not shown) to store various data. The one or more repository may be hosted by one or more storage devices, such as main memory, magnetic or optical storage based disks, tapes or hard drives, NAS, SAN, and so forth. The one or more repository can be separate from the computer systems 101-102, or the one or more repository may be part of one or more of the computer systems 101-102. In some implementations, the one or more repository may be a network-attached file server, while in other embodiments one or more repository may be some other type of persistent storage such as an object-oriented database, a relational database, a non-relational database, and so forth, that may be hosted by a server machine or one or more different machines coupled to the one or more repository via a network (not shown).

Input/output interface (I/O) 145 (or 156) herein may be and/or include a device capable of providing an interface between a processor and an external device capable of inputting and/or outputting binary data.

In some implementations, computer system 100 may be connected to a network (not shown), which may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Computer systems 101 through 102, including individual computing devices 110 through 190, may be interconnected via the network.

Processing device 114 (or 153) may execute an operating system (OS) (not shown), as well as sub-programs and/or applications of the OS to provide various features and embodiments described herein. The OS on each computing device may support one or more applications, or services residing on the respective computing device. In some examples, an application may include user application processes, virtual machines, containers and the like. For example, computing device 110 is shown to include an encrypted virtual machine 111, and a log access application 112. In some examples, a service may include a software that performs automated tasks, responds to hardware events, listens for data requests, etc. For example, computing device 150 is shown to include an access control service 151. The applications and services running on the computing devices may receive data through the network (not shown). The OS may provide an abstraction layer for the resources (especially processing device 114 or 153, memory 115 or 154, and I/O devices 116 or 156) that the applications and services may control to perform their function. The OS typically makes these resources available to the applications and services through inter-process communication mechanisms and system calls.

Implementations of the disclosure provide for establishing secure remote access to debug logs of one computer system by another computer system. In one example, computer system 101 may be a product owner's computer system that supplies one or more computer product for use on a customer's computer system 102. There are various times when the product owner may provide customer support in identifying an issue involving the one or more computer product as it runs on computer system 102. For example, the customer may have experienced a problem or a bug in the past, and needs to identify the bug, resolve the bug, and prevent it from happening again. In another example, the customer may be currently experiencing an issue, and needs to resolve the issue immediately so that the customer is not held up due to the issue, or can identify the issue while it is occurring live. In yet another example, the customer may want to know proactively if there is any potential future issue that is about to develop, resolve the issue before it occurs, and prevent it from happening altogether. Customer's computer system may accumulate information to track what actions and transactions took place within the computer system and store the information within the customer's computer system 102 to trace the actions. Memory 154 of computing device 150 of customer's computer system 102 includes debug logs 155A that track such information.

In an implementation, the computing device 150 may supply to the product owner's computer system 101 a copy of the debug logs 155A in the form of an encrypted virtual disk image 157. Computing device 150 may include an encryption engine that provides an encrypted virtualization mechanism that encrypts one or more of VMs hosted on computing device 150. In one example, the encryption engine may implement a Secure Encrypted Virtualization (SEV) feature set provided by Advanced Micro Devices (AMD®). A VM protected by the encrypted virtualization mechanism is also referred to herein as an "encrypted virtual machine" or "encrypted VM." In an example, the computing device 150 may launch an encrypted virtual machine (not shown) locally on computing device 150, set up an encrypted disk image, copy the debug logs 155A into the virtual machine, and shut down the virtual machine. As a result, the encrypted virtual disk image 157 is generated, which includes a copy of the debug log 155A, that is, it includes debug log copy 155B. The encrypted disk image 157 can be sent to the computer system 101 (or an individual computing device, such as, computing device 110) on an ad hoc basis (e.g., as needed), on-demand by the computing device 110 or 150, or on a pre-determined scheduled basis.

In an implementation, the computing device 110 receives the encrypted virtual disk image 157 from the computing device 150. In an example, the encrypted virtual disk image includes a set of debug logs, such as debug log copy 155B. Computing device 110 initiates instantiation of an encrypted virtual machine (VM) 111 using the encrypted virtual disk image 157. In one example, the VM 111 is configured to execute a log access application 112. The log access application is used to analyze debug log copy 155B to identify an issue associated with computing device 150 with respect to debug logs 155A/155B. In an example, the log access application may be an application that has been particularly authorized by the computer system 101 and/or computer system 102 to access the debug logs and perform the log analysis. In some examples, the notation that the log access application is an authorized application may be stored in a storage component, such as, memory 115 and/or memory 154. In some examples, an identification of the computing device 110 may be stored on a storage component to indicate that a log access application running on the computing device is an authorized application. The log access application 112 is thus a trusted application that can ensure secured handling of the debug logs. Granting access to the log access application 112 can minimize security and privacy risks associated with remotely sharing the debug logs otherwise.

In an implementation, in order for the log access application 112 to access the debug log copy 155B, the log access application 112 is to be given specific permission to access the content of the encrypted virtual machine disk image 157. As such, computing device 110 sends computing device 150 a request for access to the set of debug logs 155B by the log access application 112. In an example, an access processing tool 119 of computing device 110 may send and process the request for access. In an example, the access processing tool 119 may contact the access control service 151 of computing device 150. In one example, the access processing tool 119 may transmit a validation measurement 117 associated with the computing device 110 along with the request for access to the set of debug logs 155B. In one example, the validation measurement 117 is supplied by computing device 110 to indicate that the VM is executing the log access application 112. In an example, the validation measurement 117 may use a certificate. For example, computing device 110 may generate a digital signature (e.g., a cryptographic signature) using a private key. In an example, a public key corresponding to the private key may be a certificate, which can be used to verify the cryptographic signature. In some examples, the cryptographic signature may be signed by a master private key owned by the owner (e.g., vendor) of the computing device 110. In some examples, the cryptographic signature may be generated by a hardware component of computing device 110, such as, the processing device 114. In some examples, the validation measurement 117 can ensure that the log access application 112 is indeed executed on computing device 110. In an example, a log access application running on computing device 110 may be considered to be an authorized application, and the identification based on the validation measurement 117 that the log access application 112 is running on computing device 110 can ensure that an authorized application is to be given access to the debug logs 155B.

In an implementation, computer system 102, and specifically computing device 150, as shown in the example of FIG. 1, receives the request from computer system 101 for access to the set of debug logs 155B by log access application 112. In an implementation, access control service 151 on computing device 150 receives and handles the access requests. However, other components of computer system 102 may also handle the access requests. In one example, the request accompanies the validation measurement 117 associated with the computer system 101. The access control service 151 determines whether VM 111 that is initiated on computer system 101 is configured to execute an authorized log access application to access and analyze the set of debug logs 155B. In an example, access control service 151 may determine a status of the computer system 102 to verify that the system is running the log access application 112 which has been marked as an authorized (e.g., trusted) application. If it is determined that the VM is configured to execute, or is executing, the log access application 112, then access control service 151 grants the request for access to the set of debug logs 155B by the trusted log access application 112. In an example, access control service 151 may send an access key 158 to the second computer system 101 when access is granted. In one example, the access key 158 may be used for decrypting the encrypted virtual disk image 157 using access key 158 and for instantiating the VM 111 using the decrypted virtual disk image. In one example, access key 158 may be time limited, such that it expires after certain time, and such that it may not be used for accessing the debug logs after a certain time. In that case the computing device 110 may need to send another request for access for accessing the debug logs after the certain time.

On the other hand, if it is determined that the VM is not configured to execute the trusted log access application, access control service 151 denies the request for access to the set of debug logs. If access to the debug logs is denied, the computer system 101 may not access the debug logs despite having possession of the encrypted virtual disk image 157, ensuring access to the debug logs is granted only to authorized and validated system components and not to unauthorized or unknown components.

In an implementation, access processing tool 119 receives an indication granting access to the set of debug logs 155B by the log access application 112 from computer system 102. In some examples, receiving the indication granting access to the set of debug logs includes receiving the access key 158 from the computer system 102. The access key 158 may be used to access the set of debug logs 155B included in the encrypted virtual disk image 157. In an example, the access key 158 may be used to decrypt the virtual disk image 157 to instantiate the VM 111 and access the debug logs 155B. In an example, the access key may be particularly designed to be usable only by the log access application 112. In an example, access processing tool 119 may pass the access key 158 to the log access application 112 to access the debug logs 155B. Thus, the access key 158 can provide for conveniently accessing debug logs 155B by a debugger on the computer system 101 locally using computing device 110, while providing for a secure access mechanism by computer system 101 for debug logs that are generated by a computer system that is remote from computer system 101, as access key 158 limits access to the debug logs to an authorized (e.g., trusted) log access application.

In an implementation, once the log access application 112 can access debug logs 155B, log access application 112 may analyze the debug logs 155B to identify an issue associated with, or revealed by, the debug logs 155B with respect to computer system 102. In an example, Red Hat Insight™ can be used as a log access application 112 to analyze the debug logs. The log access application 112 may generate and provide an output, such as log analysis output 118, to the computer system 102 to report the identified issue based on the analysis of the debug logs. In one example, a portion of the output may be provided for display at the computing device 150 in order to limit exposure to security threats after the output has been sent outside of computing device 110. In some example, the portion of the output may be limited to a specific amount of data. For example, a threshold amount of data, or number of records, may be defined in the systems and the portion of the output provided to the computer system 102 may correspond to an amount, or number, that is less than the threshold amount, or number, to be displayed within a specified amount of time. For example, less than ten records may be provided for display per second. The threshold can be set such that the display rate does not cause a human observable latency in displaying the output. In an example, the computing device 110 also provides a record of access to the set of debug logs 155B by the log access application 112. The record may be used to identify any unauthorized, unintended, or unnecessary access that has taken place. The record can considered for deciding whether to continue to provide access to the debug logs, or remove current access to the debug logs and/or to deny subsequent access requests.

Computer system 100 may further include, although not specifically illustrated herein, a system bus or other communications mechanism for communicating information data, signals, and information between various components (e.g., I/O 116 or 156, memory 115 or 154, etc.) of the system 100. System bus may transfer data between components inside the system 100 utilizing one or more connections, such as parallel or serial bit connections.

Figure 2:
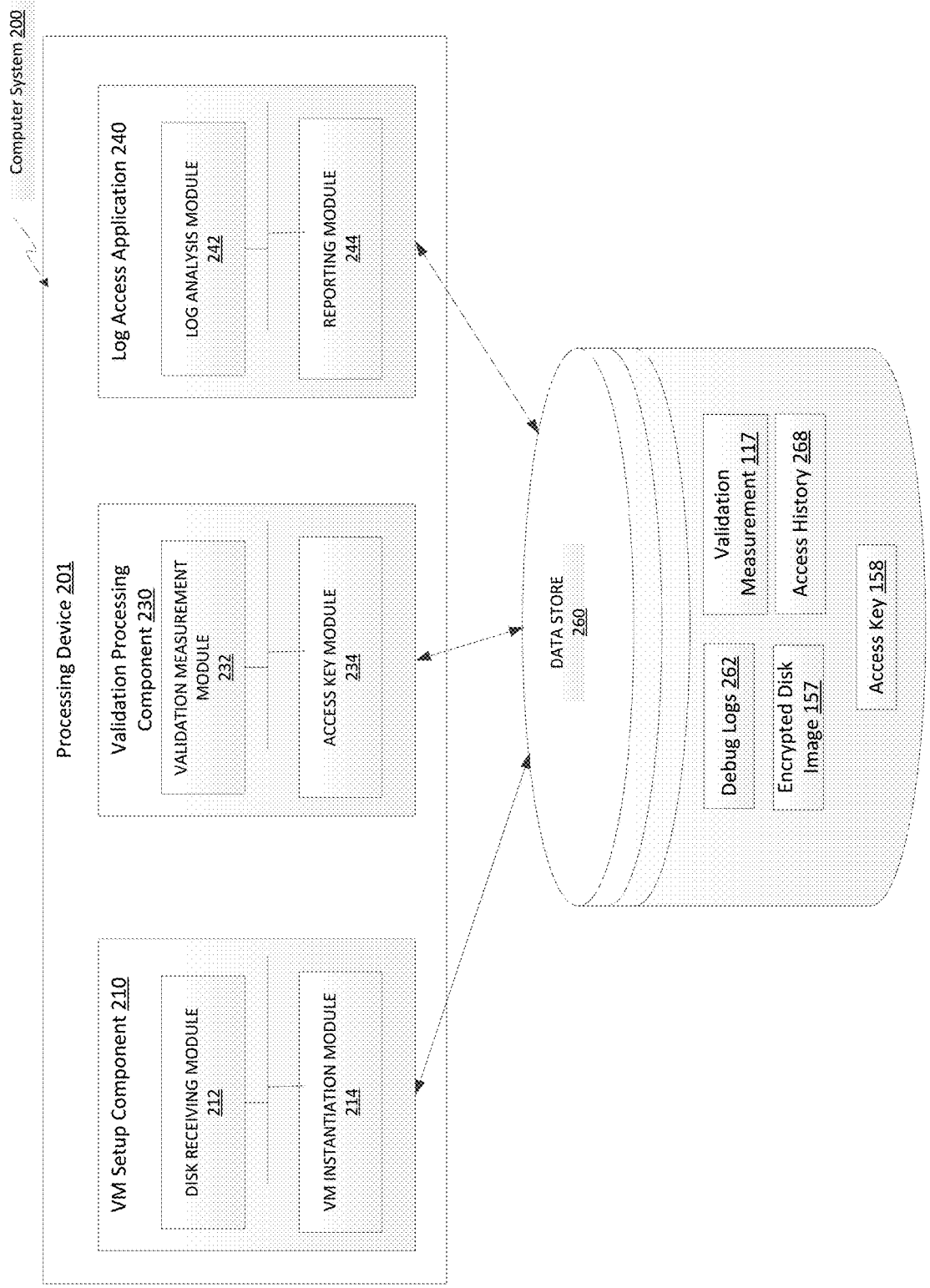
FIG. 2 depicts a block diagram of an example computer system for establishing secure remote access to debug logs, in accordance with one or more aspects of the present disclosure.

FIG. 2 is a block diagram illustrating example components and modules of the computer system 200 in accordance with one or more aspects of the disclosure. Computer system 200 may be the same or similar to the computer system 101 described with respect to FIG. 1. For example, computer system 200 may include a computing device 110. Computer system 200 may include a data store 260 and a processing device 201 operatively coupled to the data store 260. Processing device 201 may include a VM setup component 210, validation processing component 230, and log access application 240. VM setup component 210 may include a disk receiving module 212 and a VM instantiation module 214. Validation processing component 230 may include a validation measurement module 232 and an access key module 234. Log access application 240 may include a log analysis module 242 and a reporting module 244. Each of the VM setup component 210, validation processing component 230, and log access application 240 may include additional and/or different modules and submodules.

In some implementations, the data store 260 may be same as, or similar to, memory 115. Data store 260 may store debug logs 262, encrypted disk image 157, validation measurement 117, access key 158, access history 268, etc.

In one implementation of the disclosure, disk receiving module 212 of VM setup component 210 may receive, from another computer system (such as computer system 102 of FIG. 1), the encrypted virtual disk image 157, which may include debug logs 262. In an example, VM instantiation module 214 of VM setup component 210 may initiate instantiation of a virtual machine (VM) using the encrypted virtual disk image 157, wherein the VM executes a log access application 240 to analyze the set of debug logs 262 to identify an issue (e.g., a bug).

In one implementation of the disclosure, validation measurement module 232 of validation processing component 230 may transmit a validation measurement 117 to the computer system 102 to validate that the VM is executing the log access application 240. In an example, the validation measurement can be a digital signature (e.g., a cryptographic signature) generated supplied by the processing device 201 to indicate that the VM is executing the log access application 240. In one example, access key module 234 of validation processing component 230 may receive an access key 158 from the computer system 102 in view of the computer system 102 validating, based on examining the validation measurement 117, that the VM is executing the log access application 240 to access the set of debug logs 262.

Responsive to receiving the access key 158 form the computer system 102, the VM initiation module 214 (or another component of computer system 200) may decrypt the encrypted virtual disk image 157 using the access key 158 and instantiate the VM using the decrypted virtual disk image 157.

In one implementation, the log analysis module 242 of log access application 240 may analyze the debug logs 262 to identify an issue that is likely to develop in the future. For example, the issue can be a stability issue impacting the computer system 102. The log analysis module 242 may generate an output of the analysis by using the debug logs 262 as input. In one example, the reporting module 244 of log access application 240 may provide an indication to the computer system 102 that the issue is likely to develop in view of analyzing the debug logs 262. The reporting module 244 may also provide to the computer system 102 a portion of an the output generated by the log analysis module 242. The portion of the output may be provided for display on computer system 102 and may correspond to an amount that is less than a threshold amount of data to be displayed within a specified amount of time. In an example, the reporting module 244 may provide a record of an access history 268 to the debug log 262 by the log access application 240 for auditing by the first computer system as added security measures. The access history 268 may be used to identify any unauthorized, unintended, or unnecessary access to debug logs 262 that has taken place, and be taken into consideration for deciding whether to remove access to the debug logs 262 and/or to deny subsequent access requests.

Figure 3:
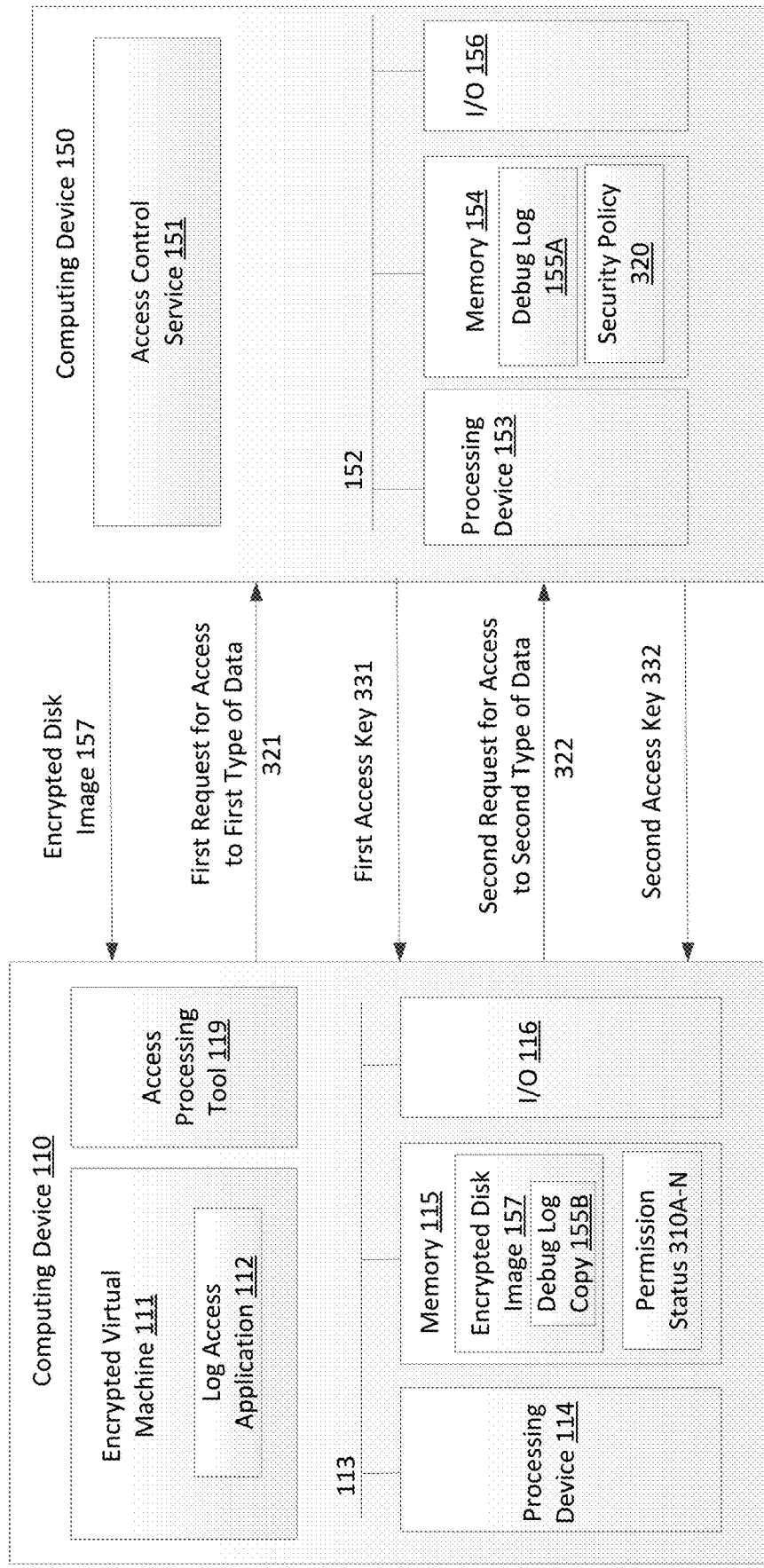
FIG. 3 depicts a block diagram of an example computer system for establishing secure remote access to portions of debug logs, in accordance with one or more aspects of the present disclosure.

FIG. 3 depicts a block diagram of an example computer system 300 for establishing secure remote access to portions of debug logs, in accordance with one or more aspects of the present disclosure. Computer system 300 may be the same or similar to the computer system 100 described with respect to FIG. 1. For example, computer system 300 may include computing device 110 and computing device 150. Components within the computing devices 110 and 150 are also depicted to be same as those depicted in FIG. 1. In the implementation with respect to FIG. 3, the interactions between computing devices 110 and 150, including the mechanism to provide access to the debug logs 155B, may be different than that described with respect to FIG. 1, and the additional and different subject matter is largely described with respect to FIG. 3.

In an implementation, computing device 110 receives, from computing device 150, the encrypted virtual disk image 157, which includes the set of debug logs 155B and initiates instantiation of the virtual machine (VM) 111 using the encrypted virtual disk image 157, wherein the VM 111 executes the log access application 112 to analyze the set of debug logs 155B (e.g., in the same way as to receiving the disk image 157 and instantiating the VM 11 in FIG. 1). In this implementation, the computing device 110 sends a first request to the computing device 150 for access to a first type of data associated with the set of debug logs 155B by the log access application 112, as shown via arrow 321. In an example, the first type of data may include a type of data associated with a specific function or task. For example, the first type of data may include journal log data, interface data, SQL log data, etc. In some example, the first type of data may overlap with and/or share another type of data. In an example, the computing device 110 may transmit validation measurement 117 along with the first request for access to the first type of data. In an example, validation measurement 117 may include a cryptographic signature supplied by the processing device to indicate that the VM is executing the log access application 112, as described previously with respect to FIG. 1.

In an example, the computing device 150 may define a security policy 320 for allowing partial access to the debug logs 155B. The computing device 150 (particularly, access control service 151, for example) may examine the first request received from the computing device 110 in view of the security policy to determine whether the access request should be granted, along with validating that the VM 111 executes the log access application 112 using the validation measurement 117. In an example, the security policy 320 may identify the types of data for which access can be granted or denied, and the extent of access to provide. For example, the security policy 320 may identify particular portions of the debug logs corresponding to particular types of data. The security policy 320 may indicate how shared data can be accessed for a data type that share data with another data type. The security policy may restrict or limit access to certain types of data, limit the rate at which the data can be accessed, how long the data can be accessed, etc. The security policy 320 may restrict access to certain types of users or applications. Various types of policies, including those not described herein, may be included in the security policy 320 to control access to the debug logs of computing device 150.

Access control service 151 may grant access to a first portion of the set of debug logs 155B upon successful validation that the VM 111 is running an authorized log access application 112 and that the request complies with the security policy 320. The first portion of the set of debug logs 155B may correspond to the first type of data. Granting access to the first portion of the set of debug logs 155B may include sending a first access key 331 to access the first portion of the set of debug logs 155B of the encrypted virtual disk image 157. In an example, access to the first portion may not allow access to other portions of the set of debug logs other than the first portion.

In an example, access processing tool 119 may receive a first indication from the computing device 150 granting access to the first portion of the debug logs 155B. In one example, the first indication granting access to the first portion of the set of debug logs is stored in memory 115 (for example, in a cache memory portion of memory 115) for automatically and quickly granting access to the first portion of the set of debug logs for a subsequent request for access to the first type of data corresponding to the first portion. For example, the grant indication may be stored in the memory 115 as one of the permission status 310A-N, which can include information such as first type of data, first portion of debug log, access status (e.g., granted, denied, pending, etc.), expiration time, etc. Using the permission status 310A-N can allow the fast access to traces (e.g., logs) of the same type in subsequent requests after one slow round trip to the access control service 151 from and to computing device 110 to request and grant the access. Upon access is granted, the log access application 112 may analyze, using the trusted log access application 112, the first portion of the set of debug logs 155B to identify a first issue associated with the first type of data.

In an example, the computing device 110 may send a second request to the computing device 150 for access to a second type of data associated with the set of debug logs 155B for the trusted log access application 112, as shown by arrow 322. Access control service may determine, similar to the first request, whether access should be granted based on the security policy 320 as it relates to the second type of data, and in view of the validation measurement 117 received with the second request. Access control service 151 may grant the access to the second portion. Access processing tool 119 may receive a second indication from the computing device granting access to a second portion of the set of debug logs 155B for the trusted log access application (along with sending second access key 332 to computing device 110), wherein the second portion of the set of debug logs 155B represent the second type of data. The grant indication may be stored in permission status 310A-N. Log access application 112 may analyze the second portion of the set of debug logs to identify a second issue associated with the second type of data associated with the set of debug logs. In another example, a second request for access to a second type of data can be denied by the access control service 151. Thus, computing device 150 is provided with a mechanism that allows controlling access on a granular level, minimizing security threats and risks. In some implementation, requests for access to the different types of data can be logged by computing device 150 and vetted by a human user, if necessary, before granting or denying an access request. With the computing device 110 periodically contacting access control service 151 for requesting access, it is possible for computing device 150 to shut down access at any time, and later restoring access voluntarily.

Figure 4:
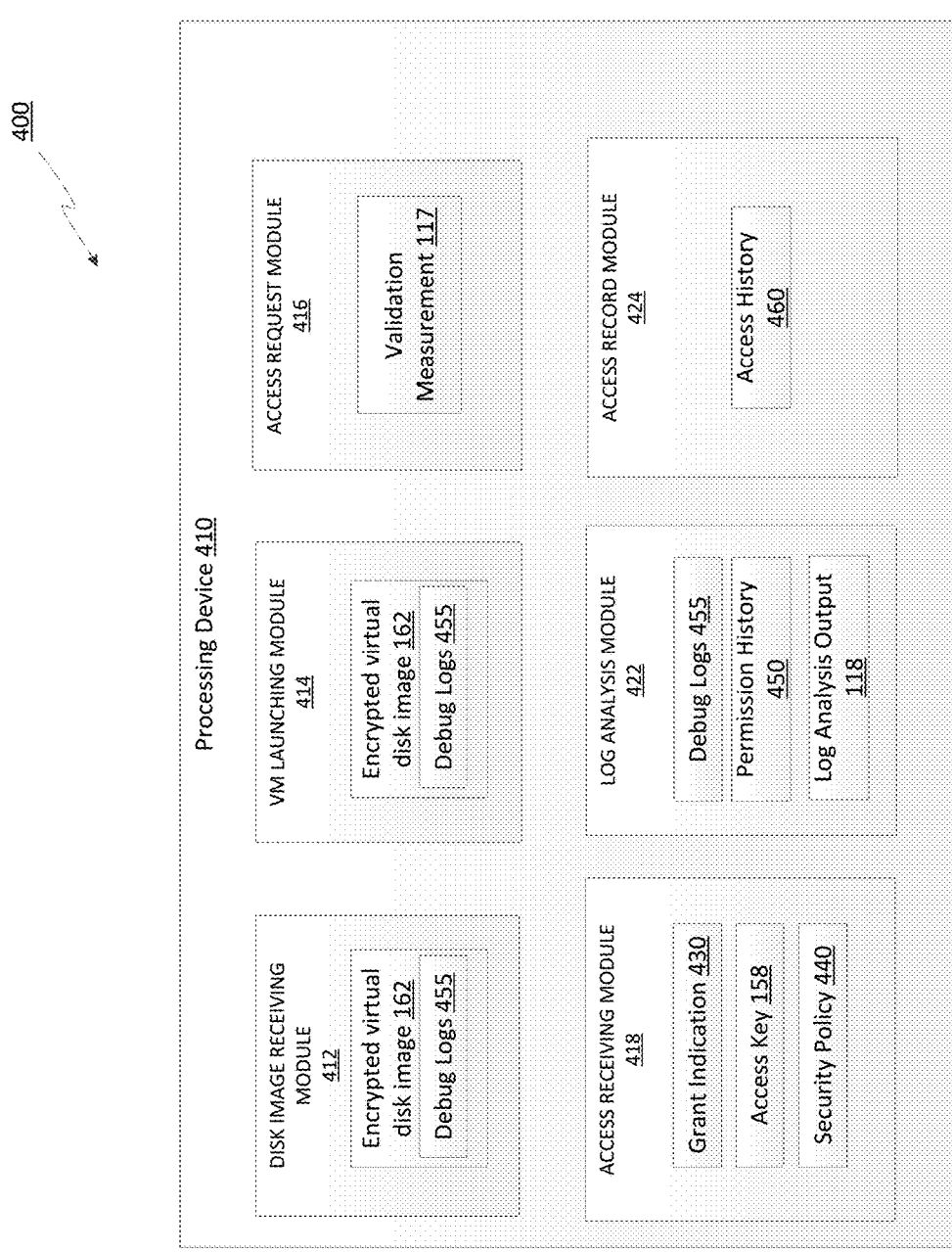
FIG. 4 depicts a block diagram of an example apparatus in accordance with one or more aspects of the present disclosure.

FIG. 4 illustrates a block diagram of an example apparatus 400 in accordance with one or more aspects of the present disclosure. The apparatus 400 may be the same or similar to components within computer system 100 of FIG. 1, computer system 200 of FIG. 2, or computing device 110 of FIG. 3. Apparatus 400 may be the same or similar to the computing device 110 described with respect to FIG. 1. In some implementations, the apparatus 400 may comprise hardware (circuitry, dedicated logic, etc.), software (e.g., software executed by a general purpose computer system or a dedicated machine), or a combination of both. In some implementations, the apparatus 400 may include processing device 410 that may execute instructions for carrying out the operations of the apparatus 400 as discussed herein. As shown, the apparatus 400 may execute instructions for a disk image receiving module 412, a VM launching module 414, an access request module 416, an access receiving module 418, a log analysis module 422, and an access record module 424, to establish a secure remote access to a set of debug logs. In one implementation, as depicted in FIG. 4, the operations of the modules of apparatus 400 are same or similar to individual components and/or modules of FIG. 2.

For example, in one implementation, the operations of log analysis module 422 may be identical to the operations of log analysis module 212.

In one implementation, components of apparatus 400 may execute instructions for carrying out operations to establish secure remote access to a set of debug logs and analyze the logs to provide indication of an issue in view of the logs. In another implementation, the components of apparatus 400 may carry out additional or different operations. For example, apparatus 400 may execute instructions to carry out operations to request access to a first type of data associated with the set of debug logs and analyze the a first portion of the set of debug logs to identify a first issue associated with the first type of data, and further request access to a second type of data associated with the set of debug logs and analyze the a second portion of the set of debug logs to identify a second issue associated with the second type of data.

In one example, processing device 410 may represent a processing device of a first computing device (such as the processing device 114 of computing device 110 of FIG. 1). In operations of apparatus 400 in the example, the disk image receiving module 412 may provide for a means for receiving an encrypted virtual disk image 162 from a second computing device, such as computing device 150 of FIG. 1. The encrypted virtual disk image 162 may include a set of debug logs, such as debug logs 455 (similar to debug log 155A or 155B of FIG. 1). The VM launching module 414 may provide for a means for instantiating a virtual machine (VM) on the first computing device using the encrypted virtual disk image 162, which includes debug logs 455. The VM may be configured to execute a trusted log access application to analyze the set of debug logs 455. For example, log analysis module 422 may represent, or be part of, the trusted log access application. The access request module 416 may provide for a means for sending a request to the second computing device to seek access to the set of debug logs 455 by the trusted log access application. In one example, the access request module 416 may transmit a validation measurement 117 associated with apparatus 400 along with the request for access to the set of debug logs 455. In one example, the validation measurement includes a digital signature (e.g., a cryptographic signature) supplied by apparatus 400 to indicate that the VM is executing the log access application. The access receiving module 418 may provide for a means for receiving a grant indication 430 from the second computing device granting access to the set of debug logs 455 by the trusted log access application. In one example, grant indication 430 may accompany an access key 158 to access the set of debug logs 455 of the encrypted virtual disk image 162. In an example, the access key 158 may be used to decrypt the virtual disk image 162 to instantiate the VM. The log analysis module 422 may provide for a means for analyzing, using the trusted log access application, the set of debug logs 455 to identify an issue associated with the set of debug logs 455. In an example, the log analysis module 422 may provide, to the computing device, a log analysis output 118, or a portion of it, generated by the log analysis module 422 to report the identified issue in view of analyzing the set of debug logs 455. In some example, the log analysis module 422 may store permission history 450 tracking one or more times that grant indication 430 is received to access the set of debug logs 455 for automatically granting access to the set of debug logs 455, or to a portion of it, for a subsequent request. The access record module 424 may provide for a means for providing, to the second computing device, a record of access (e.g., access history 460) to the set of debug logs by the trusted log access application. In one implementation, apparatus 400 may store a security policy 440 that indicates how partial access to the debug logs 155B may be handled. In an example, security policy 440 may be supplied by computing device 150.

Figure 5:
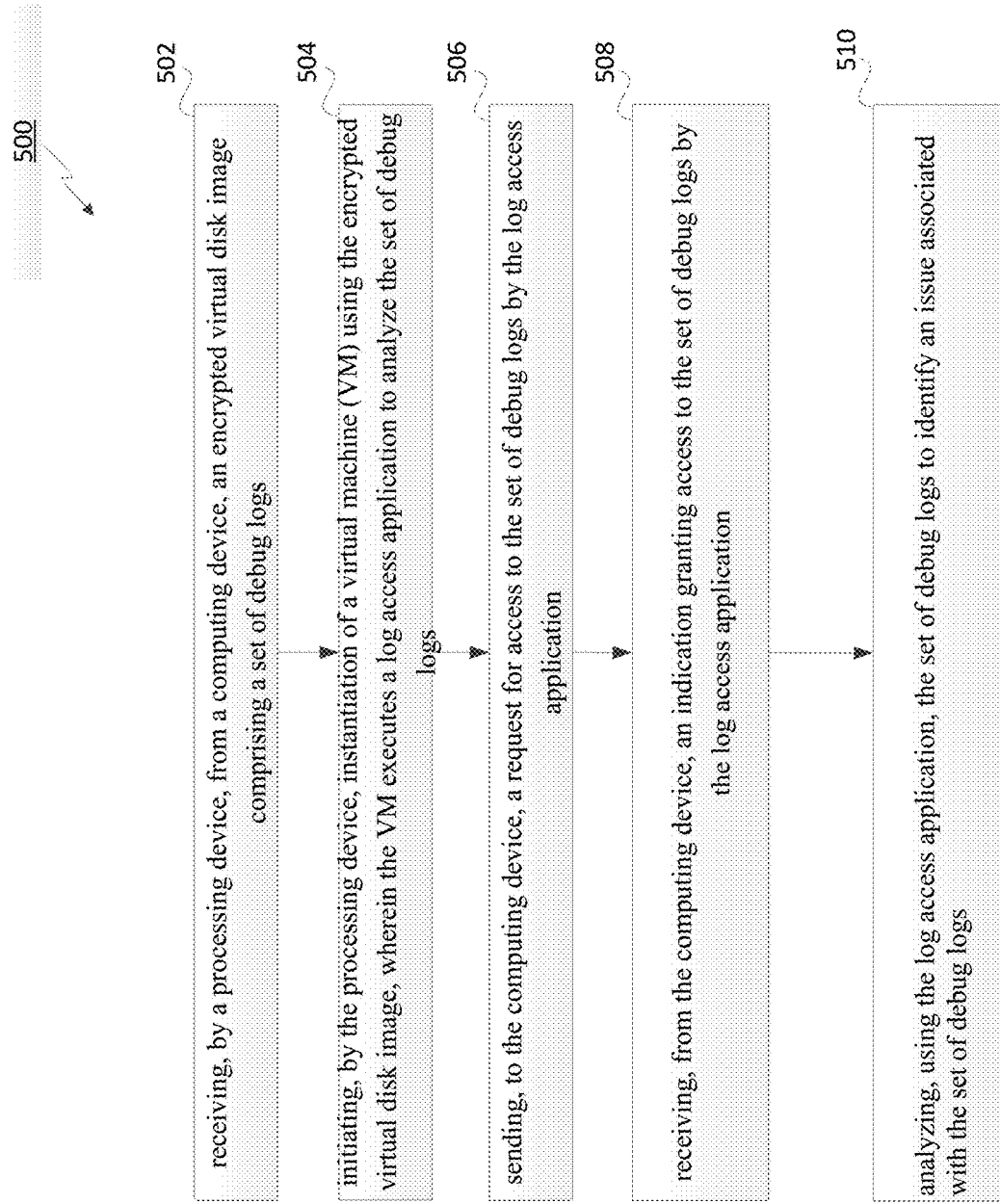
FIG. 5 depicts a flow diagram of an example implementation of establishing secure remote access to a set of debug logs, in accordance with one or more aspects of the present disclosure.

FIG. 5 depicts a flow diagram of an example method 500 for establishing secure remote access to a set of debug logs, in accordance with one or more aspects of the present disclosure. In one implementation, method 500 may be performed by the log access application 112 and/or access processing tool 119 as described herein. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of the computer system 100. It should be noted that blocks depicted in FIG. 5 can be performed simultaneously or in a different order than that depicted.

Referring to FIG. 5, at block 502, the processing logic receives, from a computing device, an encrypted virtual disk image. In an example, the encrypted virtual disk image includes a set of debug logs. The set of debug logs may be used to track actions and transactions that take place while various operations are performed using the computing device.

At block 504, the processing logic initiates instantiation of a virtual machine (VM) using the encrypted virtual disk image. In one example, the VM is configured to execute a log access application. The log access application is used to analyze the set of debug logs. The log access application may be an application that has been particularly authorized to access the debug logs and perform the log analysis.

At block 506, the processing logic sends to the computing device a request for access to the set of debug logs by the log access application. In one example, the processing logic may transmit a validation measurement associated with the processing logic along with the request for access to the set of debug logs. In one example, the validation measurement includes a digital signature supplied by the processing logic to indicate that the VM is executing the log access application.

At block 508, the processing logic receives, from the computing device, an indication granting access to the set of debug logs by the log access application. In one example, receiving the indication from the computing device granting access to the set of debug logs includes receiving a key to access the set of debug logs of the encrypted virtual disk image. In an example, the key may be used to decrypt the virtual disk image to instantiate the VM.

At block 510, the processing logic analyzes, using the log access application, the set of debug logs to identify an issue associated with the set of debug logs. Additionally, the processing logic provides, to the computing device, a portion of an output generated by the log access application to report the identified issue in view of analyzing the set of debug logs. In one example, the portion of the output is provided for display at the computing device. In some example, the portion corresponds to an amount of data that is less than a threshold amount of data that is to be displayed within a specified amount of time. Furthermore, the processing logic provides, to the computing device, a record of access to the set of debug logs by the log access application. The record may be used to identify any unauthorized, unintended, or unnecessary access that has taken place, and be considered for deciding whether to remove access to the debug logs and/or to deny subsequent access requests.

Figure 6:
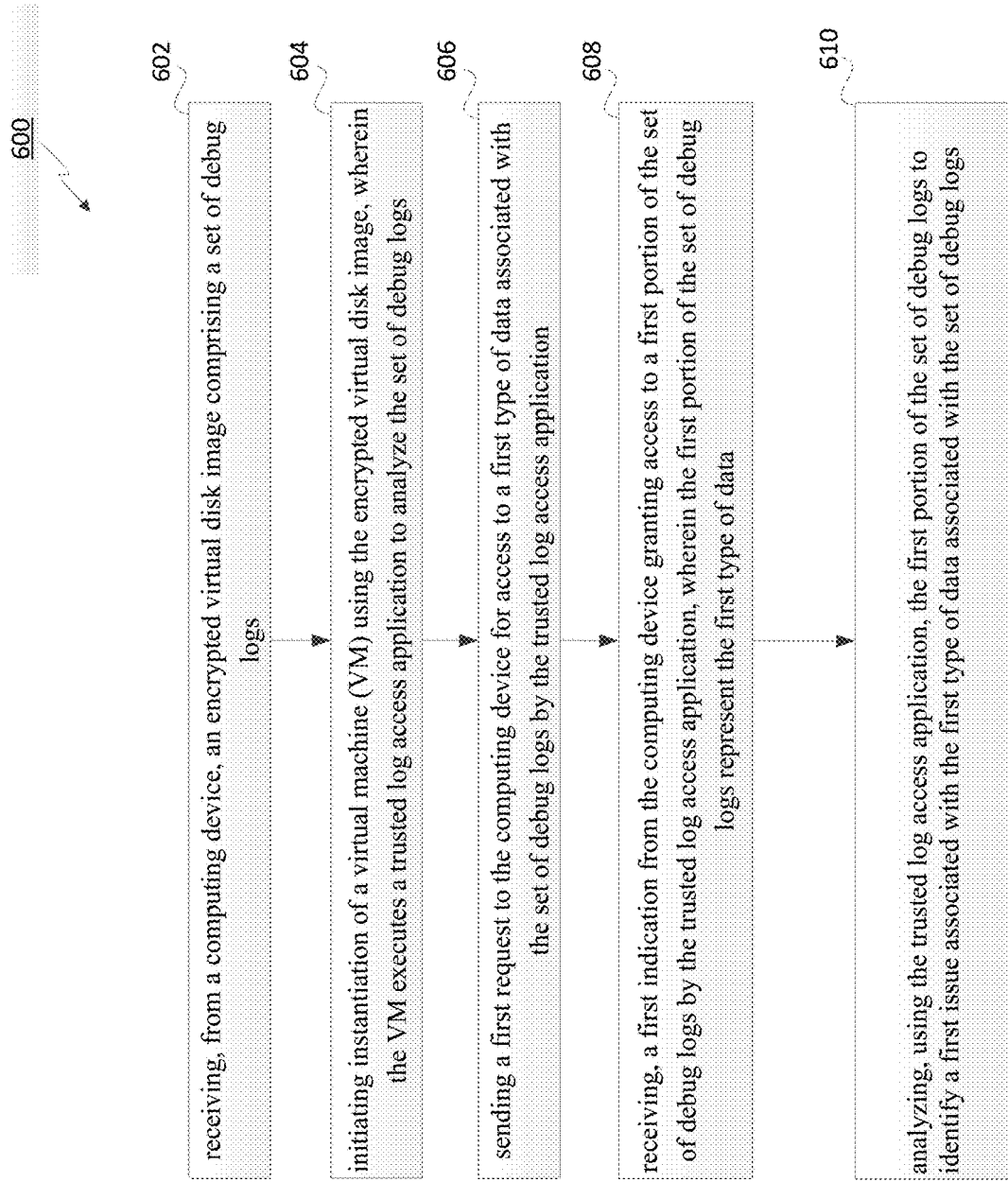
FIG. 6 depicts a flow diagram of an example method of establishing secure remote access to portions of a set of debug logs, in accordance with one or more aspects of the present disclosure.

FIG. 6 depicts a flow diagram of an example method 600 of establishing secure remote access to portions of a set of debug logs, in accordance with one or more aspects of the present disclosure. In one implementation, method 600 may be performed by the log access application 112 and/or access processing tool 119 as described herein. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of the computer system 100. It should be noted that blocks depicted in FIG. 6 can be performed simultaneously or in a different order than that depicted.

Referring to FIG. 6, at block 602, the processing logic receives, from a computing device, an encrypted virtual disk image. In an example, the encrypted virtual disk image includes a set of debug logs. The set of debug logs may track actions and transactions that take place while various operations are performed using the computing device.

At block 604, the processing logic initiates instantiation of a virtual machine (VM) using the encrypted virtual disk image. In an example, the VM executes a trusted log access application to analyze the set of debug logs. The log access application is trusted because it has been identified as an application authorized to access the debug logs.

At block 606, the processing logic sends a first request to the computing device for access to a first type of data associated with the set of debug logs by the trusted log access application. In one example, the processing log may transmit a validation measurement associated with the processing logic along with the request for access to the first type of data associated with the set of debug logs. In one example, the validation measurement includes a digital signature (e.g., a cryptographic signature) supplied by the processing logic to indicate that the VM is executing the trusted log access application.

At block 608, the processing logic receives, a first indication from the computing device granting access to a first portion of the set of debug logs by the trusted log access application, wherein the first portion of the set of debug logs represent the first type of data. In an example, access to the first portion of the set of debug logs is granted in view of a security policy defined by the computing device for the first type of data. In an example, access to the first portion does not allow access to other portions of the set of debug logs other than the first portion. In an example, receiving the first indication from the computing device granting access to the first portion of the set of debug logs comprises receiving a first key to access the first portion of the set of debug logs of the encrypted virtual disk image. In an example, the first indication granting access to the first portion of the set of debug logs is stored in a cache memory associated with the processing device for automatically granting access to the first portion of the set of debug logs for a subsequent request for access to the first portion.

At block 608, the processing logic analyzes, using the trusted log access application, the first portion of the set of debug logs to identify a first issue associated with the first type of data associated with the set of debug logs. Additionally, the processing logic provides, to the computing device, a portion of an output generated by the log access application to report the identified issue in view of analyzing the first portion of the set of debug logs.

Furthermore, the processing logic sends a second request to the computing device for access to a second type of data associated with the set of debug logs by the trusted log access application. The processing logic receives a second indication from the computing device granting access to a second portion of the set of debug logs by the trusted log access application, wherein the second portion of the set of debug logs represent the second type of data. The processing logic analyzes, using the trusted log access application, the second portion of the set of debug logs to identify a second issue associated with the second type of data associated with the set of debug logs.

Figure 7:
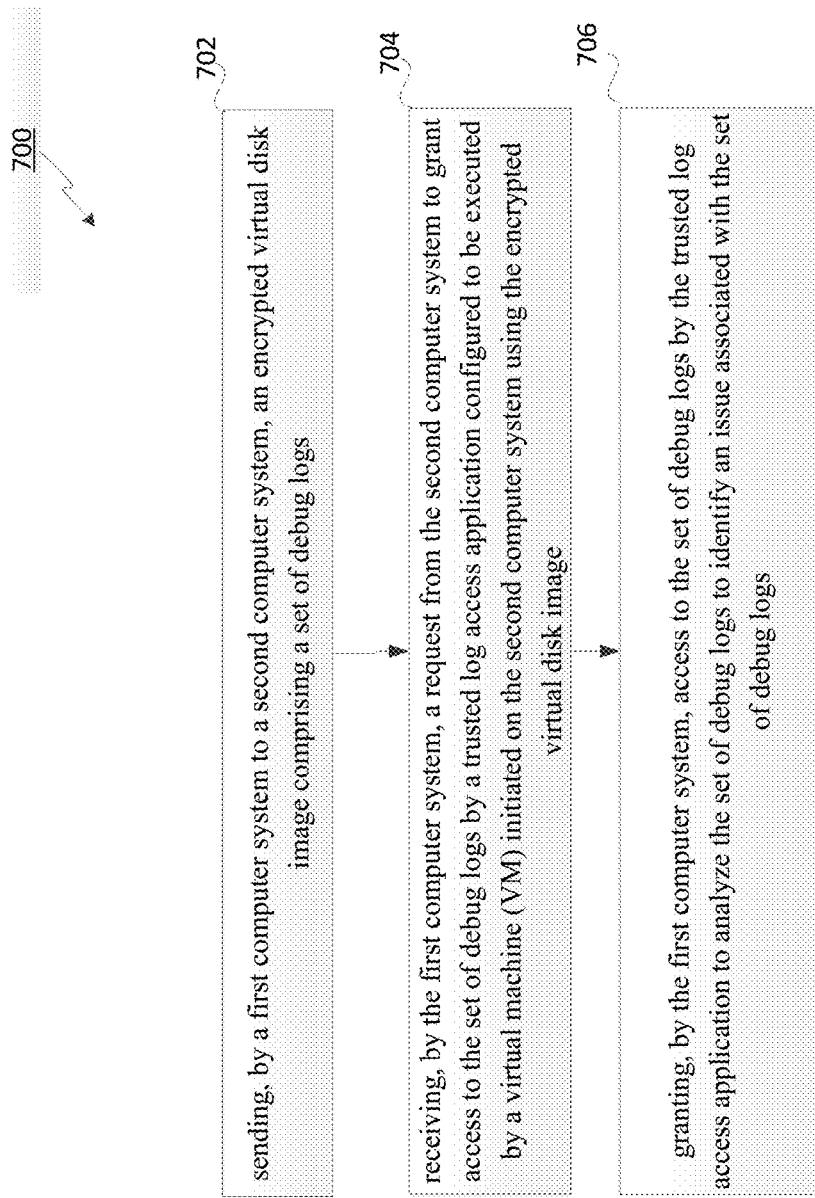
FIG. 7 depicts a flow diagram of an example method of granting secure remote access to a set of debug logs, in accordance with one or more aspects of the present disclosure.

FIG. 7 depicts a flow diagram of an example method 700 of granting secure remote access to a set of debug logs, in accordance with one or more aspects of the present disclosure. The method 700 may be performed by processing logic that may comprise hardware (circuitry, dedicated logic, etc.), software (e.g., software executed by a general purpose computer system or a dedicated machine), or a combination of both. In one implementation, method 700 may be performed by the access control tool 151 as described herein. In alternative implementations, some or all of the method 700 may be performed by other components of computer system 100. It should be noted that blocks depicted in FIG. 7 can be performed simultaneously or in a different order than that depicted.

Referring to FIG. 7, at block 702, a first computer system sends, to a second computer system, an encrypted virtual disk image comprising a set of debug logs. At block 704, the first computer system receives a request from the second computer system to grant access to the set of debug logs by a trusted log access application configured to be executed by a virtual machine (VM) initiated on the second computer system using the encrypted virtual disk image. The first computer system determines, using a validation measurement received from the second computer system, that the (VM) is configured to execute the trusted log access application to analyze the set of debug logs. At block 706, the first computer system grants access to the set of debug logs by the trusted log access application to analyze the set of debug logs to identify an issue associated with the set of debug logs. In an example, granting the request for access to the set of debug logs comprises sending a key to the second computer system for decrypting the encrypted virtual disk image using the key and for instantiating the VM using the decrypted virtual disk image. The first computer system further receives, from the second computer system, an output generated by the log access application in view of analysis of the set of debug logs.

Figure 8:
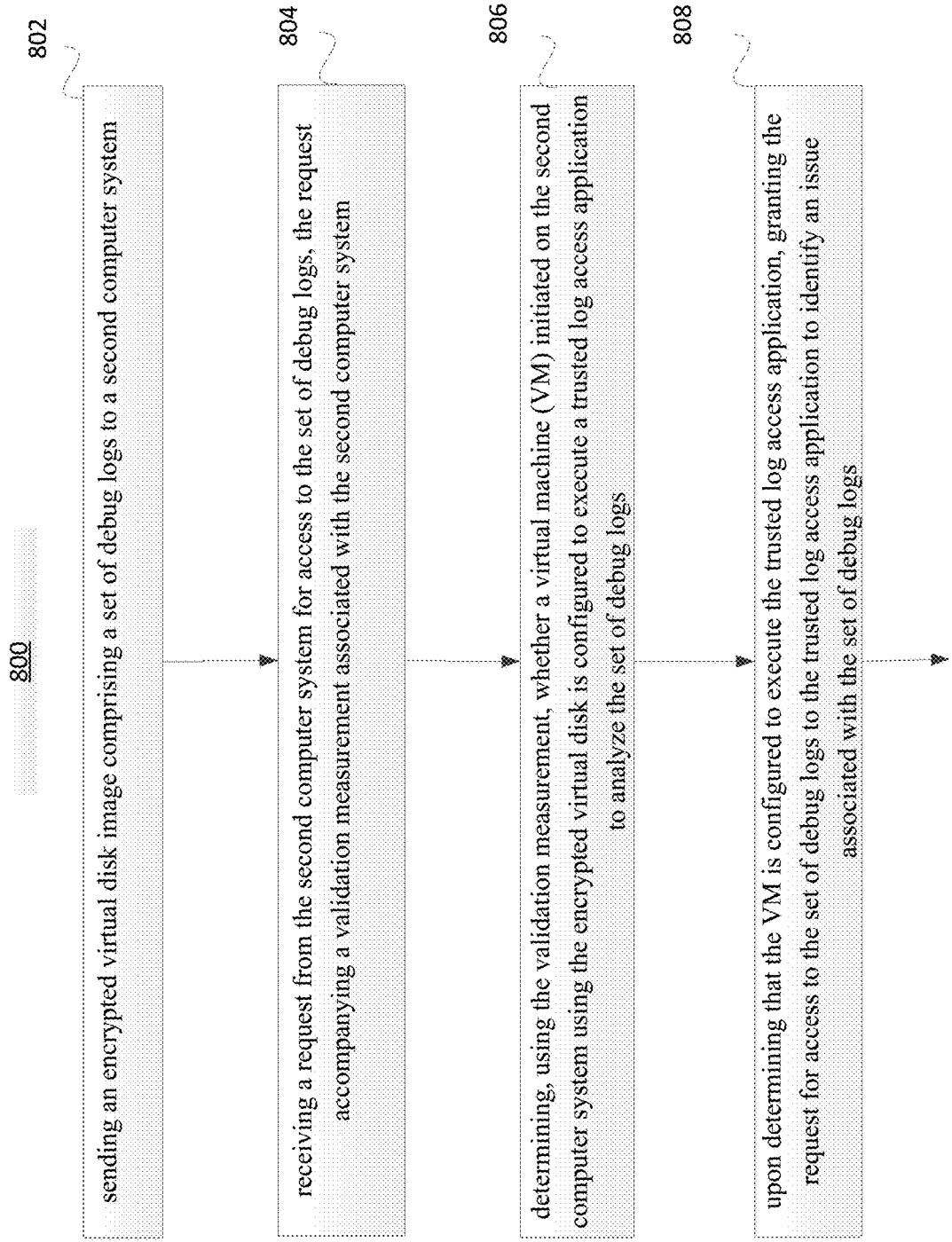
FIG. 8 depicts a flow diagram of another example method of granting access to a set of debug logs to identify an issue, in accordance with one or more aspects of the present disclosure.

FIG. 8 depicts a flow diagram of another example method 800 of granting access to a set of debug logs to identify an issue, in accordance with one or more aspects of the present disclosure. The method 800 may be performed by processing logic that may comprise hardware (circuitry, dedicated logic, etc.), software (e.g., software executed by a general purpose computer system or a dedicated machine), or a combination of both. In one implementation, method 800 may be performed by the access control tool 151 as described herein. In alternative implementations, some or all of the method 800 may be performed by other components of a computer system 102, computing device 150, or other components of computer system 100. It should be noted that blocks depicted in FIG. 8 can be performed simultaneously or in a different order than that depicted.

Referring to FIG. 8, at block 802, the processing logic of a first computer system sends an encrypted virtual disk image comprising a set of debug logs to a second computer system. At block 804, the processing logic receives a request from the second computer system for access to the set of debug logs, the request accompanying a validation measurement associated with the second computer system. In an example, the validation measurement comprises a digital signature (e.g., a cryptographic signature) supplied by the second computer system to indicate whether the VM is configured to execute the trusted log access application. At block 806, the processing logic determines, using the validation measurement, whether a virtual machine (VM) initiated on the second computer system using the encrypted virtual disk is configured to execute a trusted log access application to analyze the set of debug logs. At block 808, the processing logic, upon determining that the VM is configured to execute the trusted log access application, grants the request for access to the set of debug logs to the trusted log access application to identify an issue associated with the set of debug logs. In an example, granting the request for access to the set of debug logs comprises sending a key to the second computer system for decrypting the encrypted virtual disk image using the key and for instantiating the VM using the decrypted virtual disk image. Furthermore, the processing logic, upon determining that the VM is not configured to execute the trusted log access application, denies the request for access to the set of debug logs.

Figure 9:
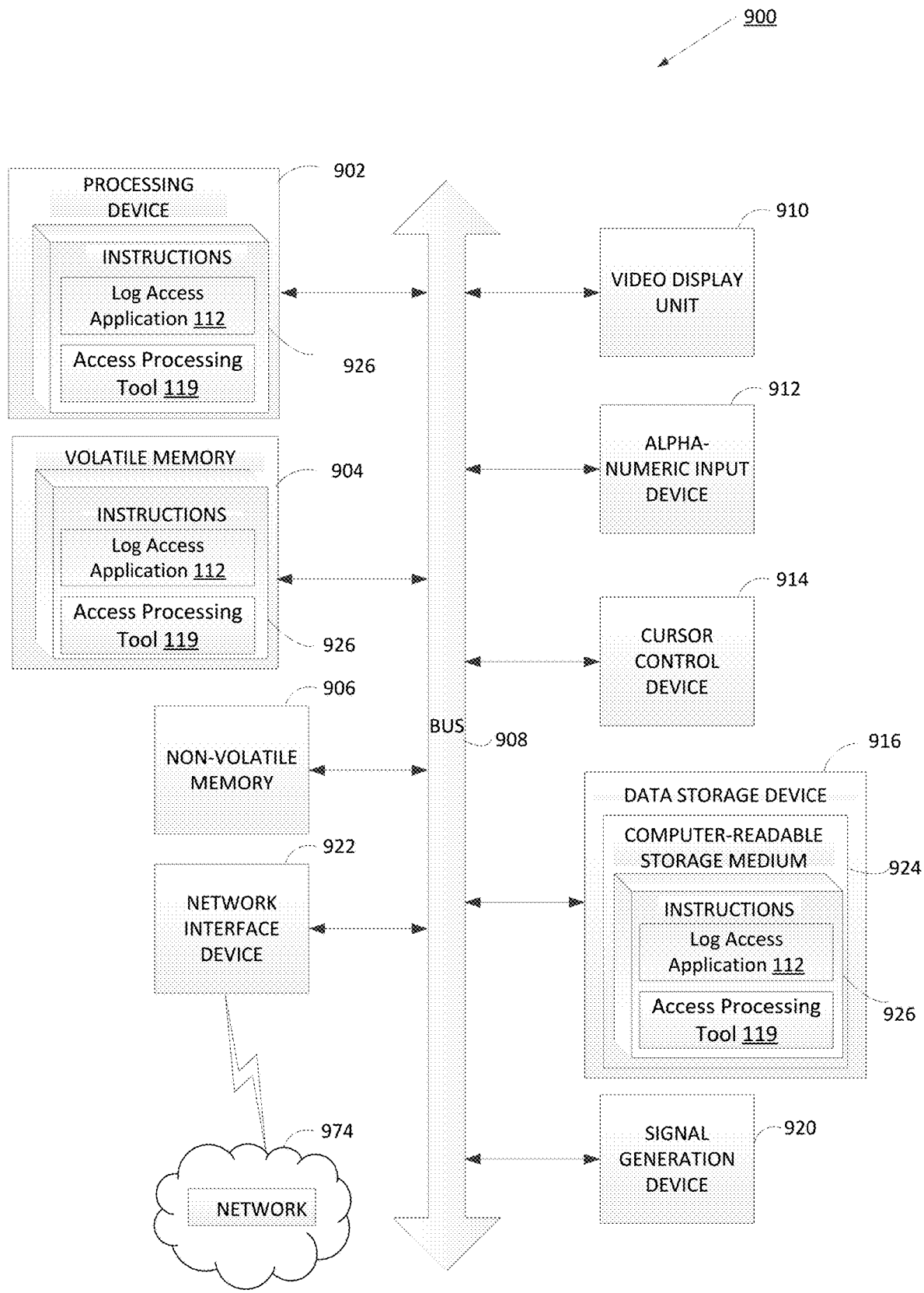
FIG. 9 depicts a block diagram of an illustrative computing device operating in accordance with the examples of the present disclosure.

FIG. 9 illustrates a diagrammatic representation of a machine in the example form of a computer system 900 within which a set of instructions, for causing the machine to perform any one or more of the methodologies discussed herein, may be executed. In various illustrative examples, computer system 900 may correspond to the computer system 200 of FIG. 2 or apparatus 400 of FIG. 4. In some implementations, the computer system 900 may support establishing secure remote access to debug logs.

The computer system 900 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein to support establishing secure remote access to debug logs.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 916, which communicate with each other via a bus 908.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is to execute the processing logic 926 for performing the operations and steps discussed herein.

The computer system 900 may further include a network interface device 922 communicably coupled to a network 925. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

Instructions 926 may reside, completely or partially, within volatile memory 904 and/or within processing device 902 during execution thereof by computer system 900, hence, volatile memory 904 and processing device 902 may also constitute machine-readable storage medium 924. The instructions 926 may also implement the log access application 112 and/or access processing tool 119, as described with reference to FIG. 1, to support establishing secure remote access to debug logs. In another example, the instructions 926 may also implement the access control service 151, as described with reference to FIG. 1, to support establishing secure remote access to debug logs.

Data storage device 916 may include a computer-readable storage medium 924 (e.g., a non-transitory computer-readable storage medium) on which may store instructions 926 encoding any one or more of the methods or functions described herein.

The non-transitory machine-readable storage medium 924 may also be used to store instructions 926 to support establishing secure remote access to debug logs described herein, and/or a software library containing methods that call the above applications. While the machine-accessible storage medium 924 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Other computer system designs and configurations may also be suitable to implement the systems and methods described herein. The following examples illustrate various implementations in accordance with one or more aspects of the present disclosure.

Example 1 is a method comprising: receiving, by a processing device, from a computing device, an encrypted virtual disk image comprising a set of debug logs; initiating, by the processing device, instantiation of a virtual machine (VM) using the encrypted virtual disk image, wherein the VM is to executes a log access application to analyze the set of debug logs; sending, to the computing device, a request for access to the set of debug logs by the log access application; and receiving, from the computing device, an indication granting access to the set of debug logs by the log access application, wherein having access to the set of debug logs allows the log access application to analyze the set of debug logs to identify an issue associated with the set of debug logs.

Example 2 is the method of example 1, further comprising: transmitting a validation measurement associated with the processing device along with the request for access to the set of debug logs.

Example 3 is the method of example 1, wherein the validation measurement comprises a cryptographic signature supplied by the processing device to indicate that the VM is executing the log access application.

Example 4 is the method of example 1, wherein receiving the indication from the computing device granting access to the set of debug logs comprises receiving a key to access the set of debug logs of the encrypted virtual disk image.

Example 5 is the method of example 1, further comprising: providing, to the computing device, a portion of an output generated by the log access application in view of analyzing the set of debug logs.

Example 6 is the method of example 5, wherein the portion of the output is provided for display and corresponds to less than a threshold amount of data to be displayed within a specified amount of time.

Example 7 is the method of example 1, further comprising: providing, to the computing device, a record of access to the set of debug logs by the log access application.

Example 8 is a system comprising a memory to store an encrypted virtual disk image; a processing device operatively coupled to the memory, to: receive, from a computer system, the encrypted virtual disk image comprising a set of debug logs; initiate instantiation of a virtual machine (VM) using the encrypted virtual disk image, wherein the VM executes a trusted log access application to analyze the set of debug logs; transmit a validation measurement to the computer system to validate that the VM is executing the trusted log access application; receive a key from the computer system in view of the computer system validating that the VM is executing the trusted log access application to access the set of debug logs; and provide an indication to the computer system that an issue is likely to develop in view of the set of debug logs.

Example 9 is the system of example 8, wherein the processing device is further to: responsive to receiving the key form the computer system, decrypt the encrypted virtual disk image using the key and instantiate the VM using the decrypted virtual disk image.

Example 10 is the system of example 8, wherein the processing device is further to: analyze, using the log access application, the set of debug logs to identify the issue that is likely to develop.

Example 11 is the system of example 8, wherein the validation measurement comprises a digital signature supplied by the processing device to indicate that the VM is executing the trusted log access application.

Example 12 is the system of example 8, wherein the processing device is further to: provide, to the computer system, a portion of an output generated by the trusted log access application in view of the set of debug logs.

Example 13 is the system of example 12, wherein the portion of the output is provided for display and corresponds to less than a threshold amount of data to be displayed within a specified amount of time.

Example 14 is the system of example 12, wherein the portion of the output is provided for display and corresponds to data to be displayed within a specified amount of time.

Example 15 is the system of example 13, wherein the portion corresponds to less than the threshold amount of data to be displayed within a particular amount of time.

Example 16 is a non-transitory computer-readable medium comprising instructions that, when executed by a processing device, cause the processing device to perform operations comprising: receiving, from a computing device, an encrypted virtual disk image comprising a set of debug logs; initiating instantiation of a virtual machine (VM) using the encrypted virtual disk image, wherein the VM is to execute a trusted log access application to analyze the set of debug logs; sending a first request to the computing device for access to a first type of data associated with the set of debug logs by the trusted log access application; and receiving, a first indication from the computing device granting access to a first portion of the set of debug logs by the trusted log access application, wherein the first portion of the set of debug logs represent the first type of data, and wherein having access to the first portion of the set of debug logs allows the log access application to analyze the first portion of the set of debug logs to identify a first issue associated with the first type of data associated with the set of debug logs.

Example 17 is the non-transitory computer-readable medium of example 16, wherein access to the first portion of the set of debug logs is granted in view of a security policy defined by the computing device for the first type of data, and wherein access to the first portion does not allow access to other portions of the set of debug logs other than the first portion.

Example 18 is the non-transitory computer-readable medium of example 14, wherein receiving the first indication from the computing device granting access to the first portion of the set of debug logs comprises receiving a first key to access the first portion of the set of debug logs of the encrypted virtual disk image.

Example 19 is the non-transitory computer-readable medium of example 14, wherein the first indication granting access to the first portion of the set of debug logs is stored in a cache memory associated with the processing device for automatically granting access to the first portion of the set of debug logs for a subsequent request for access to the first portion.

Example 20 is the non-transitory computer-readable medium of example 14, further comprising: sending a second request to the computing device for access to a second type of data associated with the set of debug logs by the trusted log access application; receiving a second indication from the computing device granting access to a second portion of the set of debug logs by the trusted log access application, wherein the second portion of the set of debug logs represent the second type of data; and analyzing, using the trusted log access application, the second portion of the set of debug logs to identify a second issue associated with the second type of data associated with the set of debug logs.

Example 21 is a method comprising: sending, by a first computer system to a second computer system, an encrypted virtual disk image comprising a set of debug logs; receiving, by the first computer system, a request from the second computer system to grant access to the set of debug logs by a trusted log access application configured to be executed by a virtual machine (VM) initiated on the second computer system using the encrypted virtual disk image; and granting, by the first computer system, access to the set of debug logs by the trusted log access application to analyze the set of debug logs to identify an issue associated with the set of debug logs.

Example 22 is the method of example 21, further comprising: prior to granting access to the set of debug logs, determining, using a validation measurement received from the second computer system, that the (VM) is configured to execute the trusted log access application to analyze the set of debug logs.

Example 22 is the method of example 21, wherein granting the request for access to the set of debug logs comprises: sending a key to the second computer system to decrypt the encrypted virtual disk image using the key and to instantiate the VM using the decrypted virtual disk image.

Example 24 is the method of example 21, further comprising: receiving, from the second computer system, an output generated by the log access application in view of analysis of the set of debug logs.

Example 25 is a non-transitory computer-readable medium comprising instructions that, when executed by a processing device of a first computer system, cause the processing device to perform operations comprising: sending an encrypted virtual disk image comprising a set of debug logs to a second computer system; receiving a request from the second computer system for access to the set of debug logs, the request accompanying a validation measurement associated with the second computer system; determining, using the validation measurement, whether a virtual machine (VM) initiated on the second computer system using the encrypted virtual disk is configured to execute a trusted log access application to analyze the set of debug logs; and upon determining that the VM is configured to execute the trusted log access application, granting the request for access to the set of debug logs to the trusted log access application to identify an issue associated with the set of debug logs.

Example 26 is the non-transitory computer-readable medium of example 25, wherein granting the request for access to the set of debug logs comprises: sending a key to the second computer system to decrypt the encrypted virtual disk image using the key and to instantiate the VM using the decrypted virtual disk image.

Example 27 is the non-transitory computer-readable medium of example 25, further comprising: upon determining that the VM is not configured to execute the trusted log access application, denying the request for access to the set of debug logs.

Example 28 is the non-transitory computer-readable medium of example 25, wherein the validation measurement comprises a digital signature supplied by the second computer system to indicate whether the VM is configured to execute the trusted log access application.

Example 29 is an apparatus comprising: a processing device associated with a first computing device; means for receiving, from a second computing device, an encrypted virtual disk image comprising a set of debug logs; means for instantiating a virtual machine (VM) on the first computing device using the encrypted virtual disk image, wherein the VM is to execute a trusted log access application to analyze the set of debug logs; means for sending a request to the second computing device to seek access to the set of debug logs by the trusted log access application; means for receiving an indication from the second computing device granting access to the set of debug logs by the trusted log access application; and means for analyzing, using the trusted log access application, the set of debug logs to identify an issue associated with the set of debug logs.

Example 30 is the apparatus of example 29, further comprising: means for providing, to the second computing device, a record of access to the set of debug logs by the trusted log access application.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "identifying," "adding," "providing," "reallocating," "generating," "receiving," "selecting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, by a processing device, from a computing device, an encrypted virtual disk image comprising a set of debug logs;
    initiating, by the processing device, instantiation of a virtual machine (VM) using the encrypted virtual disk image, wherein the VM is to execute a log access application to analyze the set of debug logs;
    sending, to the computing device, by the processing device, a validation measurement and a first request for access to a first type of data associated with the set of debug logs by the log access application, wherein the validation measurement comprises a cryptographic signature indicating that the VM is executing the log access application; and
    receiving, from the computing device, a first indication granting access to a first portion of the set of debug logs by the log access application, wherein the first portion of the set of debug logs represents the first type of data, and wherein having access to the first portion of the set of debug logs allows the log access application to analyze the first portion of the set of debug logs to identify a first issue associated with the first type of data associated with the set of debug logs.

2. The method of claim 1, wherein the validation measurement is supplied by the processing device.

3. The method of claim 1, wherein receiving the indication from the computing device granting access to the set of debug logs comprises receiving a key to access the set of debug logs of the encrypted virtual disk image.

4. The method of claim 1, further comprising:
    providing, to the computing device, a portion of an output generated by the log access application in view of analyzing the set of debug logs.

5. The method of claim 4, wherein the portion of the output is provided for display and corresponds to less than a threshold amount of data to be displayed within a specified amount of time.

6. The method for claim 1, further comprising:
    providing, to the computing device, a record of access to the set of debug logs by the log access application.

7. A system comprising:
    a memory to store an encrypted virtual disk image;
    a processing device operatively coupled to the memory, to:
        receive, from a computer system, the encrypted virtual disk image comprising a set of debug logs;
        initiate instantiation of a virtual machine (VM) using the encrypted virtual disk image, wherein the VM is to execute a trusted log access application by the processing device to analyze the set of debug logs;
        send, to the computer system, a validation measurement and a first request for access to a first type of data associated with the set of debug logs by the trusted log access application, wherein the validation measurement comprises a cryptographic signature indicating that the VM is executing the log access application; and
        receive, from the computer system, a first indication granting access to a first portion of the set of debug logs by the trusted log access application, wherein the first portion of the set of debug logs represents the first type of data, and wherein having access to the first portion of the set of debug logs allows the trusted log access application to analyze the first portion of the set of debug logs to identify a first issue associated with the first type of data associated with the set of debug logs.

8. The system of claim 7, wherein the processing device is further to:
    receive a key from the computer system in view of the computer system validating that the VM is executing the trusted log access application to access the set of debug logs; and
    responsive to receiving the key form the computer system, decrypt the encrypted virtual disk image using the key and instantiate the VM using the decrypted virtual disk image.

9. The system of claim 7, wherein the processing device is further to:
    analyze, using the trusted log access application, the set of debug logs to identify the issue that is likely to develop.

10. The system of claim 7, wherein the validation measurement is supplied by the processing device.

11. The system of claim 7, wherein the processing device is further to:
    provide, to the computer system, a portion of an output generated by the trusted log access application in view of the set of debug logs.

12. The system of claim 11, wherein the portion of the output is provided for display and corresponds to less than a threshold amount of data to be displayed.

13. The system of claim 11, wherein the portion of the output is provided for display and corresponds to data to be displayed within a specified amount of time.

14. The system of claim 12, wherein the portion corresponds to less than the threshold amount of data to be displayed within a particular amount of time.

15. A non-transitory computer-readable medium comprising instructions that, when executed by a processing device, cause the processing device to perform operations comprising:
    receiving, from a computing device, an encrypted virtual disk image comprising a set of debug logs;
    initiating instantiation of a virtual machine (VM) using the encrypted virtual disk image, wherein the VM is to execute a trusted log access application to analyze the set of debug logs;
    sending a validation measurement and a first request to the computing device for access to a first type of data associated with the set of debug logs by the trusted log access application, wherein the validation measurement comprises a cryptographic signature indicating that the VM is executing the log access application; and
    receiving, a first indication from the computing device granting access to a first portion of the set of debug logs by the trusted log access application, wherein the first portion of the set of debug logs represent the first type of data, and wherein having access to the first portion of the set of debug logs allows the log access application to analyze the first portion of the set of debug logs to identify a first issue associated with the first type of data associated with the set of debug logs.

16. The non-transitory computer-readable medium of claim 15, wherein access to the first portion of the set of debug logs is granted in view of a security policy defined by the computing device for the first type of data, and wherein access to the first portion does not allow access to other portions of the set of debug logs other than the first portion.

17. The non-transitory computer-readable medium of claim 15, wherein receiving the first indication from the computing device granting access to the first portion of the set of debug logs comprises receiving a first key to access the first portion of the set of debug logs of the encrypted virtual disk image.

18. The non-transitory computer-readable medium of claim 15, wherein the first indication granting access to the first portion of the set of debug logs is stored in a cache memory associated with the processing device for automatically granting access to the first portion of the set of debug logs for a subsequent request for access to the first portion.

19. The non-transitory computer-readable medium of claim 15, further comprising:
  sending a second request to the computing device for access to a second type of data associated with the set of debug logs by the trusted log access application;
  receiving a second indication from the computing device granting access to a second portion of the set of debug logs by the trusted log access application, wherein the second portion of the set of debug logs represent the second type of data; and
  analyzing, using the trusted log access application, the second portion of the set of debug logs to identify a second issue associated with the second type of data associated with the set of debug logs.

* * * * *